(12) United States Patent
Tai (10) Patent No.: US 10,942,514 B2
(45) Date of Patent: Mar. 9, 2021

(54) METHOD AND DEVICE FOR COMMUNICATION FAILURE DETECTION

(71) Applicant: INDUSTRIAL TECHNOLOGY RESEARCH INSTITUTE, Hsinchu (TW)

(72) Inventor: Yuan-Chu Tai, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 321 days.

(21) Appl. No.: 16/232,378

(22) Filed: Dec. 26, 2018

(65) Prior Publication Data

US 2020/0166927 A1 May 28, 2020

(30) Foreign Application Priority Data

Nov. 26, 2018 (TW) .................................. 107142050

(51) Int. Cl.
| | |
|---|---|
| *G05D 1/00* | (2006.01) |
| *B64C 39/02* | (2006.01) |

(Continued)

(52) U.S. Cl.
CPC ......... *G05D 1/0022* (2013.01); *B64C 39/024* (2013.01); *G05D 1/101* (2013.01); *G08G 5/0039* (2013.01); *G08G 5/0069* (2013.01)

(58) Field of Classification Search
CPC ..... G05D 1/0022; G05D 1/101; B64C 39/024
See application file for complete search history.

(56) References Cited

U.S. PATENT DOCUMENTS

| 7,499,804 B2 | 3/2009 | Svendsen et al. |
| 7,979,175 B2 | 7/2011 | Allard et al. |

(Continued)

FOREIGN PATENT DOCUMENTS

| CN | 102233877 A | 11/2011 |
| CN | 102955478 B | 1/2016 |

(Continued)

OTHER PUBLICATIONS

Intellectual Property Office Ministry of Economic Affairs, R.O.C., "Taiwan Office Action and Search Report for TW Appln No. 107142050", Taiwan, dated Nov. 4, 2019.

(Continued)

*Primary Examiner* — Peter D Nolan
*Assistant Examiner* — Kenneth M Dunne
(74) *Attorney, Agent, or Firm* — Locke Lord LLP; Tim Tingkang Xia, Esq.

(57) ABSTRACT

A method and a device for communication failure detection are provided. The method includes the following steps. Obtaining a piece of located path information of an unmanned vehicle. The piece of located path information indicates the unmanned vehicle is located at the located path of a plurality of paths in a route. Selecting one of a plurality of allowable periods as a located path allowable period according to the located path information. Setting a timer and starting the timer according to the located path allowable period. Under a condition that a communication module receives a periodic message before the timer reaches the located path allowable period, resetting the timer. Under a condition that the communication module does not receive the periodic message when the timer reaches the located path allowable period, determining that a communication failure occurs.

30 Claims, 6 Drawing Sheets

(51) Int. Cl.
*G05D 1/10* (2006.01)
*G08G 5/00* (2006.01)

(56) References Cited

U.S. PATENT DOCUMENTS

| | | | |
|---|---|---|---|
| 8,761,989 | B1 | 6/2014 | Murphy |
| 9,031,733 | B1 | 5/2015 | Licis et al. |
| 9,102,406 | B2 | 8/2015 | Stark et al. |
| 2010/0286845 | A1 | 11/2010 | Rekow et al. |
| 2016/0140851 | A1* | 5/2016 | Levy .................. G08G 5/045 701/3 |
| 2017/0303123 | A1 | 10/2017 | Villar |
| 2019/0054937 | A1* | 2/2019 | Graetz ............... G08G 5/0013 |

FOREIGN PATENT DOCUMENTS

| | | | | |
|---|---|---|---|---|
| CN | 205121346 | U | | 3/2016 |
| EP | 1462898 | A2 * | 9/2004 | ............ G05D 1/02 |
| JP | 2015200925 | A | | 11/2015 |
| TW | 183693 | | | 5/1992 |
| TW | 518420 | B | | 1/2003 |
| TW | 200912357 | A | | 3/2009 |
| TW | 201612068 | A | | 4/2016 |
| TW | I587899 | B | | 6/2017 |
| TW | I611280 | B | | 1/2018 |
| TW | 201804823 | A | | 2/2018 |

OTHER PUBLICATIONS

Zeng, Yong et al., "Wireless communications with unmanned aerial vehicles: opportunities and challenges", arXiv preprint arXiv:1602.03602 (2016).

Frew, Eric W. et al., "Airborne communication networks for small unmanned aircraft systems", Proceedings of the IEEE, 96,12 (2008).

Howard, Courtney, "UAV command, control & communications", Military & Aerospace Electronics, militaryaerospace.com (2013).

Cummings, Mary L. et al., "The impact of human-automation collaboration in decentralized multiple unmanned vehicle control", Proceedings of the IEEE, 100, 3 (2012): 660-671.

Mansfield, Katrina et al., "Unmanned aerial vehicle smart device ground control station cyber security threat model", 2013 IEEE International Conference on Technologies for Homeland Security (HST), 2013.

* cited by examiner

METHOD AND DEVICE FOR COMMUNICATION FAILURE DETECTION

CROSS-REFERENCE TO RELATED APPLICATIONS

This non-provisional application claims priority under 35 U.S.C. § 119(a) on Patent Application No(s). 107142050 filed in Taiwan, R.O.C on November 26, the entire contents of which are hereby incorporated by reference.

BACKGROUND

1. Technical Field

This disclosure relates to a method and a device for communication failure detection.

2. Related Art

With the advancement of technologies, lots of manufacturers and organizations have invested in the development of unmanned vehicles. Recently, there are applications of unmanned vehicles for performing tasks. However, when an unmanned vehicle is performing a task, the unmanned vehicle sometimes is in an area of better communication quality but sometimes in an area of poor communication quality. Therefore, one of current researches and developments focuses on the detection for communication failure.

SUMMARY

The present disclosure is related to a method and a device for communication failure detection.

A method for communication failure detection is disclosed according to one embodiment of this present disclosure. The method includes the following steps: obtaining a piece of located path information of an unmanned vehicle, wherein the piece of located path information indicates that the unmanned vehicle is located at a located path of a plurality of paths in a route; selecting one of a plurality of allowable periods as a located path allowable period according to the piece of located path information, and setting and starting a timer according to the located path allowable period; resetting the timer under a condition that a communication module receives a periodic message before a counting of the timer reaches the located path allowable period; and determining that a communication failure occurs under another condition that the communication module does not receive the periodic message when the counting of the timer reaches the located path allowable period.

A device for communication failure detection is disclosed according to one embodiment of this present disclosure. The device includes a communication module, a storage device, a timer and a processing unit. The communication module is configured to receive a periodic message. The storage device is configured to store a plurality of allowable periods. The timer is configured to count according to a located path allowable period. The processing unit is configured to obtain a piece of located path information of an unmanned vehicle, wherein the piece of located path information indicates that the unmanned vehicle is located at a located path of a plurality of paths in a route; the processing unit is configured to select one of the plurality of allowable periods as the located path allowable period according to the piece of located path information of the unmanned vehicle, and set and start a timer according to the located path allowable period; the processing unit is configured to reset the timer under a condition that periodic message is received before a counting of the timer reaches the located path allowable period; and the processing unit is configured to determine that a communication failure occurs under another condition that the periodic message is not received when the counting of the timer reaches the located path allowable period.

In order to make the above contents and other aspects of the present disclosure become more fully understood from the descriptions of preferable embodiments given hereinbelow as well as the accompanying drawings which are given by way of illustration, the detailed descriptions are provided as follows:

DETAILED DESCRIPTION

The technical terms in the specification of the present disclosure refer to well-known terms in the related field. If some of terms are illustrated or defined in the specification of the present disclosure, the terms should be understood based on the illustrations or definitions of the specification of the present disclosure. Each of the embodiments in the present disclosure has one or more technical features respectively. If possible, persons skilled in the art may selectively implement part or all of the technical features in any embodiment, or selectively combine part or all of the technical features in the embodiments.

Figure 1:
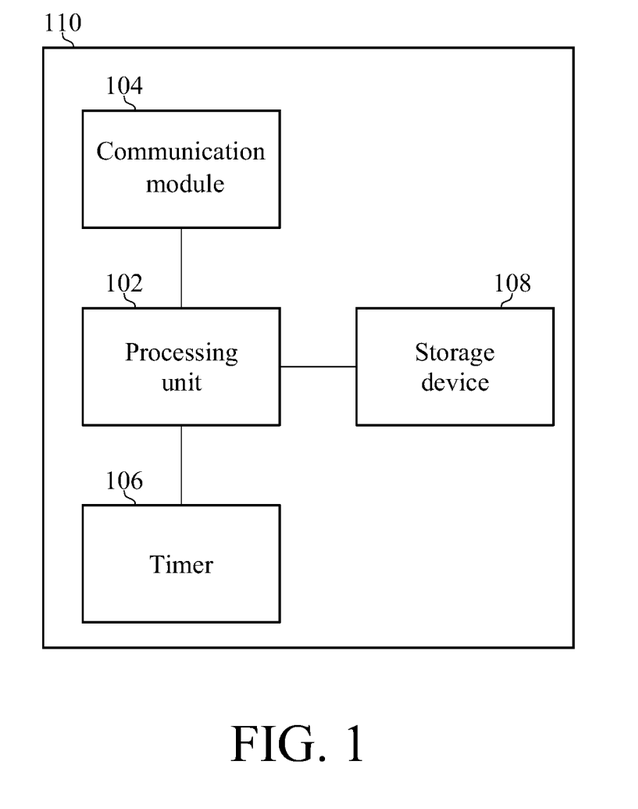
FIG. 1 illustrates a block diagram of a system for communication failure detection 110 according to one embodiment of the present disclosure.

FIG. 1 illustrates a block diagram of a system for communication failure detection 110 according to one embodiment of the present disclosure. The system for communication failure detection 110 includes a processing unit 102, a communication module 104, a timer 106 and a storage device 108. The processing unit 102 is coupled to the communication module 104, the timer 106 and the storage device 108. The communication module 104 is coupled to the processing unit 102. The timer 106 is coupled to the processing unit 102. The storage device 108 is coupled to the processing unit 102.

In one embodiment, the processing unit 102 is a hardware such as a microcontroller, a microprocessor, a processor, a central processing unit (CPU), a digital signal processor, an application specific integrated circuit (ASIC), a digital logic circuit, a field programmable gate array (FPGA) and/or other hardware elements with functions of computation and processing. In one embodiment, the processing unit 102 includes a firmware, the above hardware and/or a software or machine executable codes loaded, read, written and/or executed by the above hardware and stored in a memory (e.g. the storage device 108).

In one embodiment, the communication module 104 have a function of wireless communication. The wireless communication is performed based on techniques such as Wireless Local Area Network (WLAN), Bluetooth, ZigBee, Worldwide Interoperability for Microwave Access (WiMAX), Third Generation Of Wireless Mobile Telecommunications Technology (3G), Fourth Generation Of Cellular Network Technology (4G), Long Term Evolution (LTE) or LTE-Advanced, etc. In one embodiment, the communication module 104 includes firmware, the above hardware and/or software or machine executable codes loaded, read, written and/or executed by the above hardware and stored in a memory (e.g. the storage device 108). In one embodiment, the communication module 104 includes one or more antennas, power amplifiers, filter, digital to analog converters (DACs) and/or analog to digital converters (ADCs).

In one embodiment, the timer 106 have a function of timing and/or counting. In an example, the timer 106 counts up and/or counts down. In another example, a counting upper limit value and a counting lower limit value are given, and the timer 106 counts up from the counting lower limit value to the counting upper limit value, or the timer 106 counts down from the counting upper limit value to the counting lower limit value. The counting upper limit value and/or the counting lower limit value are preset values, and the counting is increased or decreased by an integer each time. For example, the counting is increased by 1 each time, or the counting is decreased by 2 each time. In one embodiment, the timer 106 have a function of starting and/or stopping. For example, the timer 106 receives a start command to start a counting and receives a stop command to end the counting. In one embodiment, the timer 106 have a function of reset. For example, the timer 106 receives a reset command to reset the counting to be a predetermined value (e.g. reset to be 0). In one embodiment, the start command and the reset command are included in a single command, so that the timer 106 resets the counting to be a predetermined value and starts to count. In one embodiment, the stop command and the reset command are included in a single command, so that the timer 106 stops the counting and resets the counting to be the predetermined value. The timer 106 includes firmware, the above hardware and/or software or machine executable codes loaded, read, written and/or executed by the above hardware and stored in a memory (e.g. the storage device 108). In one embodiment, the timer 106 includes a counter and a register, wherein the register is configured to set up a counting upper limit value and/or a counting lower limit value in the register, and the counter is configured to count. For example, the counter counts up from a predetermined value to an upper limit value.

In one embodiment, the storage device 108 is hardware with functions of memory or storage. The storage device 108 is, for example, a volatile memory or a non-volatile memory, a register, a memory (e.g. a random-access memory (RAM)), a hard disk, a solid state disk (SSD), a flash Memory or a read-only memory (ROM).

Figure 2A:
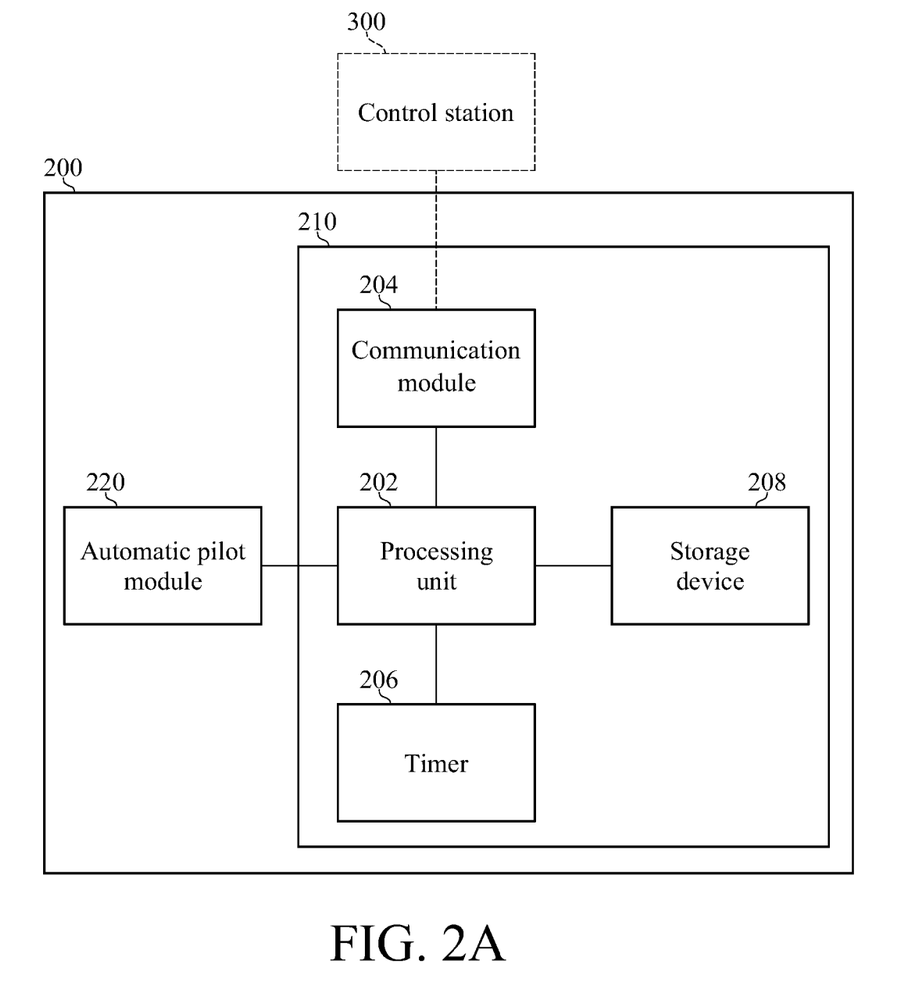
FIG. 2A illustrates a block diagram of a device for communication failure detection according to one embodiment of the present disclosure.

FIG. 2A illustrates a block diagram of a device for communication failure detection according to one embodiment of the present disclosure. In one embodiment, the device for communication failure detection is an unmanned vehicle 200. The unmanned vehicle 200 is, for example, an unmanned car, an unmanned aerial vehicle (UAV), an unmanned boat or an unmanned submarine, etc. The unmanned vehicle 200 includes a system for communication failure detection 210 and an automatic pilot module 220.

The system for communication failure detection 210 includes a processing unit 202, a communication module 204, a timer 206 and a storage device 208. The processing unit 202 is coupled to the communication module 204, the timer 206, the storage device 208 and the automatic pilot module 220. The communication module 204 is coupled to the processing unit 202 and wirelessly communicates with a control station 300. The timer 206 is coupled to the processing unit 202. The storage device 208 is coupled to the processing unit 202. The descriptions of the processing unit 202, the communication module 204, the timer 206 and the storage device 208 in FIG. 2A can be referred to the descriptions of the processing unit 102, the communication module 104, the timer 106 and the storage device 108 in FIG. 1. The automatic pilot module 220 is coupled to the processing unit 202.

In one embodiment, the automatic pilot module 220 have a function of autopilot, such as taking off, landing, stopping at a position on land or in the air or in/above the liquid (e.g. water), raising, falling, forwarding, backwarding, turning and/or driving or flying from one waypoint to another waypoint. In one embodiment, the control station 300 sends out a control message, and the communication module 204 of the unmanned vehicle 200 receives the control message. After the processing unit 202 of the unmanned vehicle 200 processes the control message, the automatic pilot module 220 is ordered to change routes or tasks. In one embodiment, the automatic pilot module 220 sends one or more messages to the control station 300 via the processing unit 202 and the communication module 204. For example, the one or more messages are associated with emergencies. In one embodiment, the automatic pilot module 220 includes a firmware, the above hardware and/or a software or machine executable codes loaded, read, written and/or executed by the above hardware and stored in a memory (e.g. the storage device 208).

Figure 2B:
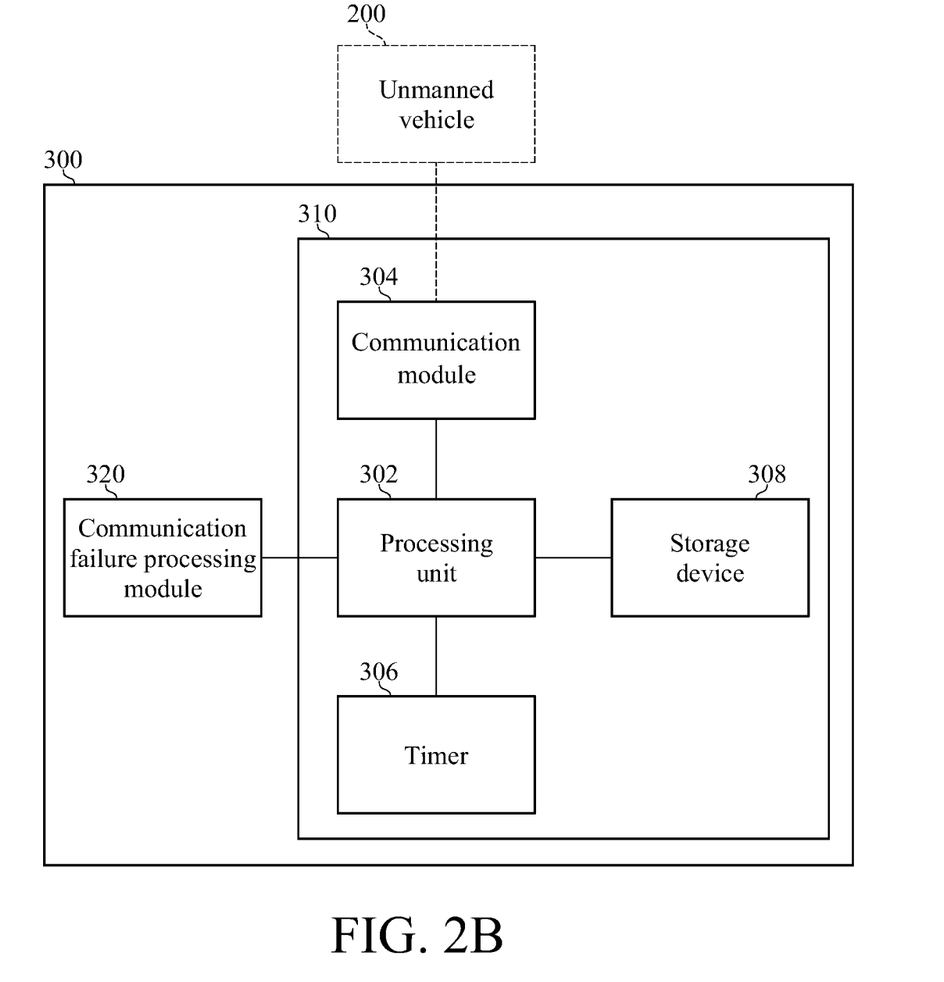
FIG. 2B illustrates a block diagram of a device for communication failure detection according to another embodiment of the present disclosure.

FIG. 2B illustrates a block diagram of a device for communication failure detection according to another embodiment of the present disclosure. In one embodiment, the device for communication failure detection is a control station 300. The control station 300 have functions such as communication with the unmanned vehicle 200, data transmission and/or reception with the unmanned vehicle 200, operation and/or control on the unmanned vehicle 200, etc. The control station 300 includes a system for communication failure detection 310 and a communication failure processing module 320.

The system for communication failure detection 310 includes a processing unit 302, a communication module 304, a timer 306 and a storage device 308. The processing unit 302 is coupled to the communication module 304, the timer 306, the storage device 308 and the communication failure processing module 320. The communication module 304 is coupled to the processing unit 302 and wirelessly communicates with the unmanned vehicle 200. The timer 306 is coupled to the processing unit 302. The storage device 308 is coupled to the processing unit 302. The descriptions of the unmanned vehicle 200 and the control station 300 in FIG. 2B can be referred to the descriptions of the unmanned vehicle 200 and the control station 300 in FIG. 2A. Regarding the descriptions of the processing unit 302, the communication module 304, the timer 306 and the storage device 308 in FIG. 2B, please refer to the descriptions of the processing unit 102, the communication module 104, the timer 106 and the storage device 108 in FIG. 1. The communication failure processing module 320 is coupled to the processing unit 302.

In one embodiment, the communication failure processing module 320 performs an emergency processing or sends a notification to a user when the communication is failed. For example, a message is displayed via a displaying device (not shown in figures), a flashing light is emitted, an alarm bell is triggered and/or an alarm voice is released, etc. In one embodiment, the communication failure processing module 320 includes a firmware, the above hardware and/or a software stored or machine executable codes loaded, read, written and/or executed by the above hardware and stored in a memory (e.g. the storage device 308).

Figure 3:
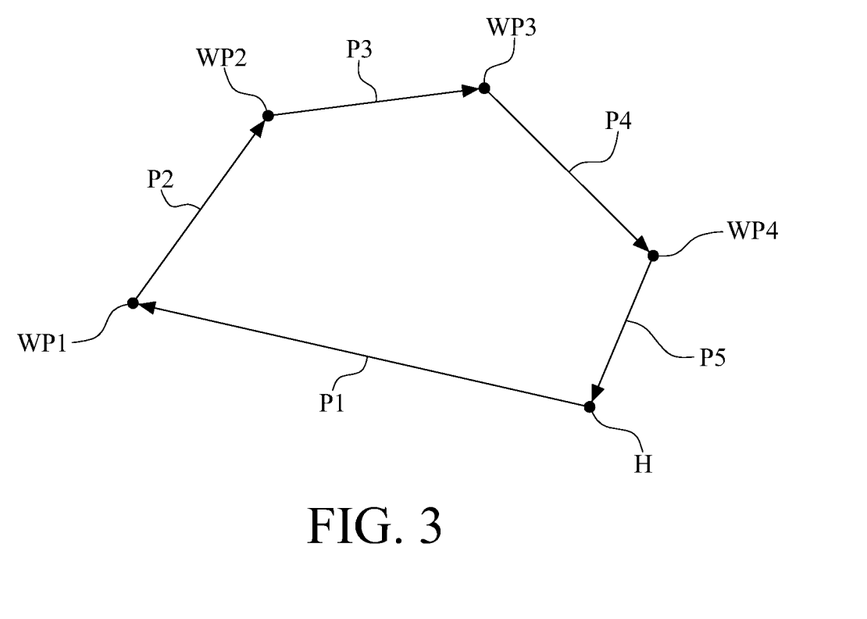
FIG. 3 illustrates a diagram of a route of task performed by the unmanned vehicle 200 according to one embodiment of the present disclosure.

FIG. 3 illustrates a diagram of a route of task performed by the unmanned vehicle 200 according to one embodiment of the present disclosure. Please refer to FIG. 1, FIG. 2A-2B and FIG. 3. In the embodiment, the unmanned vehicle 200 is an UAV. In this embodiment, the unmanned vehicle 200 performs a task, and a route of the task includes a plurality of paths and a plurality of waypoints. The route includes, for example, flying from a base station H to a first waypoint WP1 through a first path P1, flying from the first waypoint WP1 to a second waypoint WP2 through a second path P2, flying from the second waypoint WP2 to a third waypoint WP3 through a third path P3, flying from the third waypoint WP3 to a fourth path P4 through a fourth waypoint WP4, and flying from the fourth waypoint WP4 back to the base H a through a fifth path P5. The unmanned vehicle 200 performs one waypoint-task or various waypoint-tasks at the base station H, the first waypoint WP1, the second waypoint WP2, the third waypoint WP3 and/or the fourth waypoint WP4, and the waypoint-tasks includes, for example, aerial photography, measurements, data collections or goods deliveries, etc. In one embodiment, the unmanned vehicle 200 stays above each waypoint. In one embodiment, the unmanned vehicle 200 lands, performs a process of charging, or performs a battery replacement at each waypoint. In one embodiment, the base station H is considered as a waypoint. In one embodiment, the paths are either linear or curved. In one embodiment, minor deviations (e.g. caused by factors of climate, geography and/or collision avoidance (CA), etc.) from the existing path is considered as part of the path. In the embodiment of FIG. 3, an origin and a destination of the unmanned vehicle 200 which performs the task both are the base H, and the unmanned vehicle 200 starts from the base H, passes through each of the waypoints and then returns to the base H. In another embodiment, the origin and the destination of the unmanned vehicle 200 are different. In the embodiment of FIG. 3, the control station 300 is disposed in the base H. In one embodiment, the control station 300 is disposed in either the origin or the destination. In one embodiment, both of the origin and the destination are disposed with the control stations 300, and the control stations 300 exchanges messages with each other via communication or internet. In one embodiment, the control station 300 is disposed in some places different from the origin and the destination. In one embodiment, when the unmanned vehicle 200 performs a task, the control station 300 sends a periodic message to the unmanned vehicle 200 every fixed period (e.g. 1 second). In one embodiment, when the unmanned vehicle 200 performs a task, the unmanned vehicle 200 sends a periodic message to the control station 300 every fixed period. In one embodiment, when the unmanned vehicle 200 performs a task, the unmanned vehicle 200 and the control station 300 send a periodic message to each other every fixed period. The period for the unmanned vehicle 200 sends out the periodic message may be identical to or different from the period for the control station 300 to send out the periodic message.

In one embodiment, due to factors of climate, seasons, geography and/or electromagnetic interference, the periodic message from the control station 300 may not be received by the unmanned vehicle 200 every time, or the periodic message from the unmanned vehicle 200 may not be received by the control station 300 every time. For example, after the control station 300 sends out three periodic messages, the unmanned vehicle 200 only receives one of the three periodic messages with missing the other two periodic messages. In one embodiment, each of the plurality of paths corresponds to a corresponding allowable period, which allows a communication disconnection between the unmanned vehicle 200 and the control station 300 as the unmanned vehicle 200 flies through each path. In one embodiment, for example, the communication disconnection includes conditions in which the unmanned vehicle 200 does not receive the periodic message from the control station 300, or the control station 300 does not receive the periodic message from the unmanned vehicle 200. As shown in FIG. 3, the first path P1 corresponds to a first allowable period T1, the second path P2 corresponds to a second allowable period T2, the third path P3 corresponds to a third allowable period T3, the fourth path P4 corresponds to a fourth allowable period T4, and the fifth path P5 corresponds to a fifth allowable period T5. In one embodiment, a corresponding relationship between the paths and the corresponding allowable periods is built as a table of path-allowable period. Table 1 serves as an example of a table of path-allowable period based on FIG. 3.

TABLE 1

| Path | Allowable period |
| --- | --- |
| First path P1 | First allowable period T1 |
| Second path P2 | Second allowable period T2 |
| Third path P3 | Third allowable period T3 |
| Fourth path P4 | Fourth allowable period T4 |
| Fifth path P5 | Fifth allowable period T5 |

In one embodiment, the table of path-allowable period is stored in the storage device 208 of the unmanned vehicle 200. In one embodiment, the table of path-allowable period is stored in the storage device 308 of the control station 300. In one embodiment, the table of path-allowable period includes a predetermined allowable period. In one embodiment, at least two of the corresponding allowable periods of the paths are different from each other. For example, the first allowable period T1 is 5 seconds, and the third allowable period T3 is 12 seconds.

In one embodiment, the unmanned vehicle 200 performs a test flight before performing the task so as to determine the corresponding allowable periods of the paths. The unmanned vehicle 200 which performs the task and the unmanned vehicle 200 which performs the test flight are identical to each other. In another embodiment, the unmanned vehicle 200 which performs the task and the unmanned vehicle 200 which performs the test flight are different from each other. When performing the test flight in a path (e.g. the first path P1), the unmanned vehicle 200 records each time point at which the periodic message sent by the control station 300 is received in first path P1 or records each time interval defined by two adjacent time points at which the periodic messages are received, and takes a maximum time interval or a sum of the maximum time interval and a tolerance (e.g. a percentage of the maximum period or a fixed value) as the first allowable period T1. Particularly, the maximum time interval is one of a plurality of time intervals while each of the plurality of time intervals is defined by two adjacent time points. More specifically, for example, the control station 300 sends out the periodic message at intervals of one second. When performing the test flight, the unmanned vehicle, in the first path P1, receives the periodic message sent by the control station 300. The time point of receiving the periodic message for the first time is 3 seconds after departing, the time point of receiving the periodic message for the second time is 10 seconds after departing, and the time point of receiving the periodic message for the third time is 15 seconds after departing. From the above descriptions, it is found that the time intervals of receiving the periodic message are 3 seconds (3−0=3), 7 seconds (10−3=7) and 5 seconds (15−10=5) respectively. Therefore, the value of 7 seconds is taken as the first allowable period T1. In another example, a tolerance (e.g. 10%) can be applied to the value of 7 seconds, and then the first allowable period T1 becomes 7 sec*110%=7.7 sec. In another example, the tolerance can be a fixed value such as 2 seconds, then the first allowable period T1 is equal to 7 seconds+2 seconds=9 seconds. In one embodiment, when the unmanned vehicle 200 performs the test flight, the time points or time intervals of receiving the periodic messages of the unmanned vehicle 200 are recorded and the corresponding allowable period for each of paths is determined by the control station 300. The method for determining the corresponding allowable periods are identical or similar to the aforementioned descriptions. In one embodiment, after determining the corresponding allowable periods, the processing unit 102, the processing unit 202 and/or the processing unit 302 stores the corresponding allowable periods in the storage device 108, the storage device 208 and/or the storage device 308. In one embodiment, the processing unit 102, the processing unit 202 and/or the processing unit 302 establishes a table of path-allowable period, and further stores the table of path-allowable period in the storage device 108, the storage device 208 and/or the storage device 308.

In one embodiment, the corresponding allowable period is determined according to the distance between the path and the control station 300. For example, the path far away from the control station 300 may have a poorer communication quality; however, in this case, it is still possible to perform the task safely. Therefore, the allowable period of the path which is far away from the control station 300 can be set to be longer, so that the condition in which the communication failure is frequently triggered to drive the unmanned vehicle 200 to return can be avoided. On the contrary, the path close to the control station 300 may have a better communication quality, therefore, the allowable period of the path which is close to the control station 300 can be set to be shorter, so that the safety of the task is improved. For example, the third allowable period T3 of the third path P3 can be set to be longer while the fifth allowable period T5 of the fifth path P5 can be set to be shorter.

Figure 4:
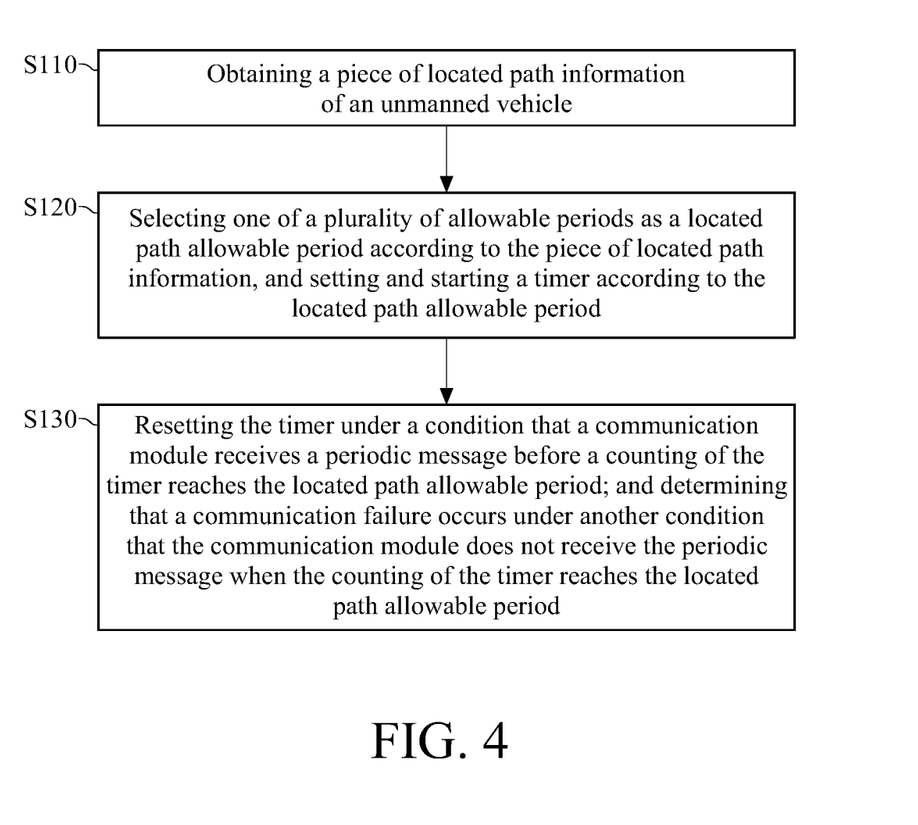
FIG. 4 illustrates a flow chart of a method for communication failure detection according to one embodiment of the present disclosure.

FIG. 4 illustrates a flow chart of a method for communication failure detection according to one embodiment of the present disclosure. In one embodiment, the method for communication failure detection is applied to a control system for an unmanned vehicle 200. The control system for the unmanned vehicle 200 includes an unmanned vehicle 200 and a control station 300. Detailed descriptions with reference to embodiments are provided below, and the order of performing the steps is not limited. Please refer to FIG. 1, FIG. 3 and FIG. 4. In step S110, the processing unit 102 obtains a piece of located path information of the unmanned vehicle 200, wherein the piece of located path information indicates that the unmanned vehicle 200 is located at a located path of a plurality of paths in a route. Perform step S120 after performing step S110. In step S120, the processing unit 102 selects one of a plurality of allowable periods from the storage device 108 as a located path allowable period according to the piece of located path information of the unmanned vehicle 200. The processing unit 102 sets the timer and starts the timer 106 according to the located path allowable period. The located path allowable period is the maximum period of allowable communication disconnection between the unmanned vehicle 200 and the control station 300 in the located path. Perform step S130 after performing step S120. In step S130, in the condition that the communication module 104 receives the periodic message before the counting of the timer 106 reaches the located path allowable period, the processing unit 102 resets the timer 106. In the condition that the communication module 104 does not receive the periodic message when the counting of the timer 106 reaches the located path allowable period, the processing unit 102 determines that the communication fails.

An embodiment is provided below to illustrate the method for communication failure detection performed by the unmanned vehicle 200. Please refer to FIG. 2A, FIG. 3, and FIG. 4. In step S110, the processing unit 202 obtains a piece of located path information of the unmanned vehicle 200, wherein the piece of located path information indicates that the unmanned vehicle 200 is located at a located path of the plurality of paths in the route. In one embodiment, the way to obtain the piece of located path information of the unmanned vehicle 200 includes, for example, the automatic pilot module 220 obtaining the position of the unmanned vehicle 200 and notifying the processing unit 202, so that the processing unit 202 determines the located path of the unmanned vehicle 200 according to the position of the unmanned vehicle 200 for obtaining the piece of located path information. In one embodiment, the way to obtain the piece of located path information of the unmanned vehicle 200 includes, for example, the processing unit 202 obtaining the position of the unmanned vehicle 200 and determining the located path of the unmanned vehicle 200 according to the position of the unmanned vehicle 200 for obtaining the piece of located path information. In one embodiment, the way to obtain the position of the unmanned vehicle 200 includes, for example, obtaining the position by using a global positioning system (GPS), a base-station position provided by a base station around the unmanned vehicle 200, determinations of an image recognition device (e.g. a camera) equipped in the unmanned vehicle 200, etc. In one embodiment, the way to obtain the piece of located path information of the unmanned vehicle 200 includes, for example, the processing unit 202 recording information of the waypoint where the unmanned vehicle 200 arrived previously in the storage device 208, and further determining the located path of the unmanned vehicle 200 by using the information of the waypoint where the unmanned vehicle 200 arrived previously so as to obtain the piece of located path information. For example, if the waypoint where the unmanned vehicle 200 arrived previously is the third waypoint WP3, then it is determined that the unmanned vehicle 200 is in the fourth path P4. If the waypoint where the unmanned vehicle 200 arrived previously is the base H, then it is determined that the unmanned vehicle 200 is in the first path Pl. Perform step S120 after performing step S110.

In step S120, the processing unit 202 selects one of the plurality of allowable periods stored in the storage device 208 as the located path allowable period according to the located path information of the unmanned vehicle 200. The processing unit 202 sets the timer and further starts the timer 206 according to the located path allowable period, wherein the located path allowable period is the maximum period of allowable communication disconnection between the unmanned vehicle 200 and the control station 300 in the located path. In this embodiment, for example, the communication disconnection includes a condition in which the unmanned vehicle 200 does not receive the periodic message sent by the control station 300 in the fixed period (or with a tolerance) of sending periodic message by the control station 300. Performing step S130 after performing step S120. In step S130, in the condition in which the communication module 204 receives the periodic message sent by the control station 300 before the counting of the timer 206 reaches the located path allowable period, the processing unit 202 resets the timer 206. In the condition in which the communication module 204 does not receive the periodic message sent by the control station 300 when the counting of the timer 206 reaches the located path allowable period, the processing unit 202 determines that the communication fails.

An embodiment is provided below for illustrating the method for communication failure detection performed by the control station 300. Please refer to FIG. 2B, FIG. 3 and FIG. 4. In step S110, the processing unit 302 obtains the piece of located path information of the unmanned vehicle 200, wherein the piece of located path information indicates that the unmanned vehicle 200 is located at a located path of the plurality of paths. In one embodiment, the way to obtain the piece of located path information of the unmanned vehicle 200 includes, for example, the unmanned vehicle 200 obtaining the position of the unmanned vehicle 200 and reporting the position to the control station 300, and the communication module 304 receiving the position reported by the unmanned vehicle 200. Accordingly, the processing unit 302 determines the located path of the unmanned vehicle 200 according to the position reported by the unmanned vehicle 200 for obtaining the piece of located path information of the unmanned vehicle 200. The way to obtain the position of the unmanned vehicle 200 by the unmanned vehicle 200 can be refer to the aforementioned descriptions. In one embodiment, the way to obtain the piece of located path information of the unmanned vehicle 200 includes, for example, when the unmanned vehicle 200 arrives each of the waypoints, the unmanned vehicle 200 and/or each of the waypoints reports to the control station 300. The communication module 304 receives the report message, and the processing unit 202 determines the located path of the unmanned vehicle 200 according to the report message for obtaining the piece of located path information. The method for determination can be refer to the aforementioned descriptions. Perform step S120 after performing step S110. In step S120, the processing unit 302 selects one of the plurality of allowable periods stored in the storage device 308 as the located path allowable period according to the piece of located path information of the unmanned vehicle 200. The processing unit 302 sets the timer and starts the timer 306 according to located path allowable period, wherein the located path allowable period is the maximum period of allowable communication disconnection between the unmanned vehicle 200 path and the control station 300 in the located. In this embodiment, for example, the communication disconnection includes a condition in which the control station 300 does not receive the periodic message of the unmanned vehicle 200 in the fixed period (or with a tolerance) of sending the periodic message by the unmanned vehicle 200. Perform step S130 after performing step S120. In step S130, in the condition that the communication module 304 receives the periodic message sent by the unmanned vehicle 200 before the counting of the timer 306 reaches the located path allowable period, the processing unit 302 resets the timer 306. In the condition that the communication module 304 does not receive the periodic message sent by the unmanned vehicle 200 when the counting of the timer 306 reaches the located path allowable period, the processing unit 302 determines that the communication fails.

Figure 5:
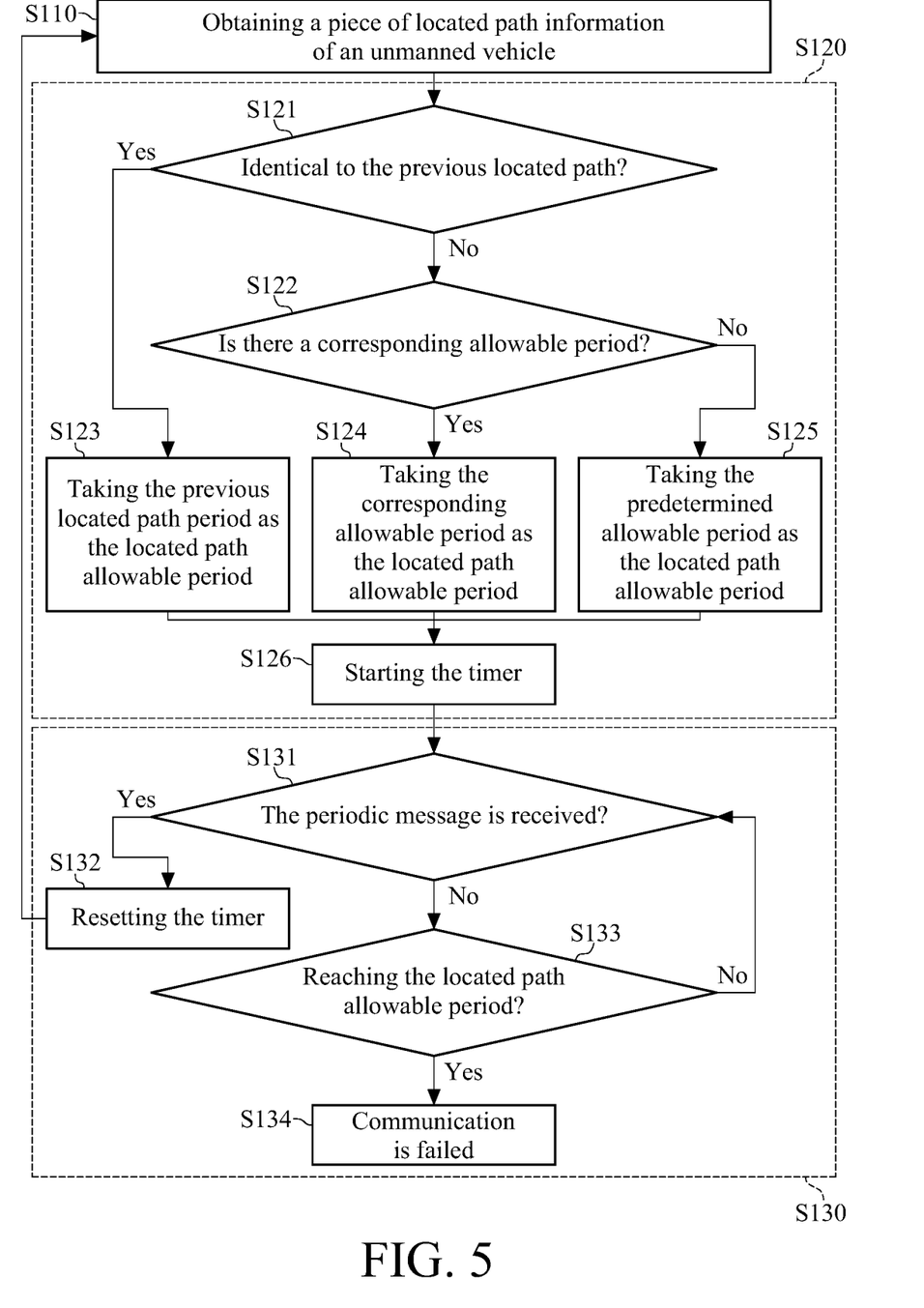
FIG. 5 illustrates a flow chart of a method for communication failure detection according to one embodiment of the present disclosure.

FIG. 5 illustrates a flow chart of a method for communication failure detection according to one embodiment of the present disclosure. In this embodiment, step S121 to step S126 serve as a detailed embodiment of step S120, and step S131 to step S134 serve as a detailed embodiment of step S130. One or more embodiments are provided below for illustration. However, the order of performing steps is not limited. Please refer to FIG. 1, FIG. 3, FIG. 4 and FIG. 5.

In step S110, the processing unit 102 obtains the piece of located path information of the unmanned vehicle 200, wherein the piece of located path information indicates that the unmanned vehicle 200 is located at a located path of the plurality paths in the route. In one embodiment, the processing unit 102 stores the piece of located path information of the unmanned vehicle 200 in the storage device 108, wherein the piece of located path information which is stored serves as a piece of previous located path information for next communication failure detection. The detailed descriptions of step S110 and the descriptions of FIG. 4 can be referred to each other. Perform step S121 after performing step S110.

In step S121, the processing unit 102 determines whether the located path of the unmanned vehicle 200 is identical to the previous located path of the unmanned vehicle 200. If so, perform step S123 after performing step S121. If not, perform step S122 after performing step S121. In one embodiment, the processing unit 102 determines whether the located path of the unmanned vehicle 200 is identical to the previous located path of the unmanned vehicle 200 according to the piece of located path information and the piece of previous located path information. In one embodiment, the processing unit 102 determines whether the located path of the unmanned vehicle 200 is identical to the previous located path of the unmanned vehicle 200 according to the presence or absence of a change of the waypoint where the unmanned vehicle 200 previously arrived. In one embodiment, step S121 may be omitted, and it is possible to perform step S122 after performing step S110.

In step S123, the processing unit 102 takes the previous located path allowable period as the located path allowable period, and set the timer 106 based on the located path allowable period. In one embodiment, in the condition that the located path of the unmanned vehicle 200 is identical to the previous located path of the unmanned vehicle 200, the previous located path allowable period is taken as the located path allowable period. Perform step S126 after performing step S123. In one embodiment, since the previous located path allowable period has been set in the timer 106 in the previous communication failure detection, step S123 can be omitted and perform step S126 after step S121.

In step S122, the processing unit 102 determines whether the located path of the unmanned vehicle 200 has a corresponding allowable period. If so, perform step S124 after performing step S122. If not, perform step S125 after performing step S122. In one embodiment, the processing unit 102 determines whether the storage device 108 stores the located path of the unmanned vehicle 200 as well as the corresponding allowable period. If the storage device 108 stores the located path of the unmanned vehicle 200 as well as the corresponding allowable period, then the result of the determination in step S122 is positive. However, if the storage device 108 does not store the located path of the unmanned vehicle 200 as well as the corresponding allowable period, then the result of the determination in step S122 is negative. In one embodiment, the processing unit 102 reads the table of path-allowable period stored in the storage device 108, and determines whether the table of path-allowable period includes the locate path of the unmanned vehicle 200 as well as the corresponding allowable period. If the table of path-allowable period includes the located path of the unmanned vehicle 200 as well as the corresponding allowable period, then the result of the determination in step S122 is positive. However, if the table of path-allowable period does not include the located path of the unmanned vehicle 200 as well as the corresponding allowable period, then the result of the determination in step S122 is negative.

In step S124, the processing unit 102 takes the corresponding allowable period as the located path allowable period, and set the timer 106 based on the located path allowable period. In one embodiment, in the condition that the located path of the unmanned vehicle 200 has the corresponding allowable period, the corresponding allowable period is taken as the located path allowable period. Perform step S126 after performing step S124. In one embodiment, the processing unit 102 further stores the corresponding allowable period in the storage device 108, wherein the corresponding allowable period which is stored serves as a previous located path allowable period for next communication failure detection. In one embodiment, the processing unit 102 sets the located path allowable period into a register of the timer 106. The setting of the register would not change until the next communication failure detection, therefore, the located path allowable period serves as a previous located path allowable period for the next communication failure detection.

In step S125, the processing unit 102 takes a predetermined allowable period as the located path allowable period, and sets the timer 106 based on the located path allowable period. In one embodiment, the predetermined allowable period is taken as the located path allowable period in the condition that it is determined that the located path of the unmanned vehicle 200 does not have the corresponding allowable period. Perform step S126 after performing step S125. In one embodiment, the processing unit 102 further stores the predetermined allowable period in the storage device 108, wherein the predetermined allowable period which is stored serves as a previous located path allowable period for next communication failure detection. In one embodiment, the processing unit 102 sets the located path allowable period into a register of the timer 106. The setting of the register would not change until the next communication failure detection, therefore, the located path allowable period serves as a previous located path allowable period for the next communication failure detection.

In step S126, the timer 106 is started according to the located path allowable period. In one embodiment, the timer 106 counts up (e.g. increasing by 1 each time) from a preset value (e.g. 0) to the located path allowable period (e.g. 10). In one embodiment, the timer 106 counts down (e.g. decreasing by 1 each time) from the located path allowable period (e.g. 10) to the preset value (e.g. 0). In one embodiment, the timer 106 is started after the processing unit 102 sets the timer 106 in step S123, step S124 and/or step S125, so step S126 can be incorporated into step S123, step S124 and/or step S125. Perform step S131 after performing step S126.

In step S131, the processing unit 102 determines whether the communication module 104 receives the periodic message. If so, then perform step S132 after performing step S131. If not, perform step S133 after performing step S131.

In step S132, the processing unit 102 resets the timer 106. In one embodiment, the processing unit 102 resets the timer 106 for the next communication failure detection. For example, if the timer counts up from 0, the processing unit 102 resets the counter of the timer 106 to be 0 for the next communication failure detection to start to count from 0. In one embodiment, the processing unit 102 resets the counter of the timer 106, but does not resets the register of the timer 106. Perform step S110 after performing step S132 so as to start the next communication failure detection.

In step S133, the processing unit 102 determines whether the counting of the timer 106 reaches the located path allowable period. If so, perform step S134 after performing step S133. If not, perform step S131 after performing step S133 to again determine whether the periodic message is received or not.

In step S134, the processing unit 102 determines that the communication fails, and enables the communication failure processing mechanism.

In one embodiment, the processing unit 102 determines whether the communication module 104 receives the periodic message. The timer 106 is reset in the condition in which it is determined that the communication module 104 receives the periodic message. Determine whether the counting of the timer 106 reaches the located path allowable period in the condition in which it is determined that the communication module 104 does not receive the periodic message. Determine that the communication fails and enable a communication failure processing mechanism in the condition in which it is determined that the counting of the timer 106 reaches the located path allowable period. Re-determine whether the communication module 104 receives the periodic message in the condition in which it is determined that the counting of the timer 106 does not reach the allowable period.

In one embodiment, step S131 and step S133 are interchangeable. For example, determine whether the counting of the timer reaches the located path allowable period, if so, determine that the communication is failed. If not, determine whether the periodic message is received. If the periodic message is received, reset the timer. If the periodic message is not received, determine whether the counting of the timer reaches the located path allowable period again. In one embodiment, step S131 and step S133 are performed simultaneously.

An embodiment is given below to illustrate the method for communication failure detection performed by the unmanned vehicle 200. Please refer to FIG. 2A, FIG. 3, FIG. 4 and FIG. 5, and further refer to the descriptions of the aforementioned embodiments.

Since the detailed descriptions regarding step S110 to step S126 as well as step S132 are similar to the descriptions of the aforementioned embodiments and/or descriptions of FIG. 4, please refer to the aforementioned descriptions.

In step S131, the processing unit 202 determines whether the communication module 204 receives the periodic message sent by the control station 300. If so, perform step S132 after performing step S131. If not, perform step S133 after performing step S131.

In step S133, the processing unit 202 determines whether the counting of the timer 206 reaches the located path allowable period. If so, perform step S134 after performing step S133. If not, perform step S131 after performing step S133 to again determine whether the periodic message, sent by the control station 300, is received.

In step S134, the processing unit 202 determines that the communication fails and enables a communication failure processing mechanism. In one embodiment, the processing unit 202 notifies the automatic pilot module 220 of the communication failure. In one embodiment, the communication failure processing mechanism includes triggering a safety mechanism, triggering a fail-safe mechanism, notifying the automatic pilot module 220 to return (e.g. returning to the base H or the control station 300), return to a previous path or a previous waypoint in which the communication is not failed, stay at a present location and/or land.

An embodiment is given for illustrating the method for communication failure detection implemented by the control station 300. Please refer to FIG. 2B, FIG. 3, FIG. 4 and FIG. 5, and refer to the descriptions of the aforementioned embodiments as well.

The descriptions of step S110 to step S126 as well as step S132 are similar to the descriptions of the aforementioned embodiment and/or descriptions of FIG. 4, so please refer to the aforementioned descriptions.

In step S131, the processing unit 302 determines whether the communication module 304 receives the periodic message sent by the unmanned vehicle 200. If so, performing step S132 after performing step S131. If not, performing step S133 after performing step S131.

In step S133, the processing unit 302 determines whether the counting of the timer 306 reaches the located path allowable period. If so, performing step S134 after performing step S133. If not, performing step S131 after performing step S133 to again determine whether the periodic message, sent by the unmanned vehicle 200, is received.

In step S134, the processing unit 302 determines that the communication fails and enables a communication failure processing mechanism. In one embodiment, the processing unit 302 notifies the communication failure processing module 320 of the communication failure. In one embodiment, the communication failure processing mechanism includes displaying a message in a display, emitting a light signal and/or releasing a voice signal to remind a user of the communication failure for emergence processing.

In one embodiment, when the unmanned vehicle 200 is going to enter or is entering the path which has a larger allowable period and in which the communication disconnection occurs frequently (e.g. arriving the waypoint prior to the path in which, according to the records, the communication disconnection occurs frequently and/or being in the path in which the communication disconnection occurs frequently), the processing unit 302 notifies a user (e.g. by displaying a message in a display or releasing a voice) that the unmanned vehicle 200 is going to enter/entering the path in which the communication quality is poor.

In one embodiment, when the unmanned vehicle 200 is going to enter/entering the path (e.g. a path where the communication failure processing mechanism is often enabled based on the past records) in which the communication may fail, the processing unit 302 notifies a user (e.g. by displaying a message in a display or releasing a voice) that the unmanned vehicle 200 is going to enter/entering the path in which the communication quality is failed, so as to remind the user to prepare for emergency.

In one embodiment, the corresponding allowable period of the path can be adjusted. In one embodiment, the unmanned vehicle 200 and/or the control station 300 stores a plurality pieces of information regarding the serial numbers of tasks, the paths, the corresponding allowable periods of the paths, the time that the periodic messages are received, the periods of communication disconnection (e.g. for how long the periodic messages are not received) and/or whether the communication failure processing mechanism is enabled in the storage device 208 and/or the storage device 308, so as to adjust the corresponding allowable periods of the paths, and further stores the adjusted corresponding allowable periods are in the storage device 208 and/or the storage device 308. In one embodiment, the corresponding allowable periods of the paths are adjusted by the unmanned vehicle 200 and/or the control station 300. In one embodiment, the corresponding allowable periods of the paths are adjusted when the unmanned vehicle 200 is performing the task or after the unmanned vehicle 200 performs the task.

In one embodiment, the unmanned vehicle 200 performs the task in the route. When the unmanned vehicle 200 continuously performs the task for a plurality of times (e.g. the task is performed continuously for three times), if the communication failure processing mechanism is enabled in a specific one of paths for each of the plurality of times, the corresponding allowable period of the specific path is increased by a fixed amount or by a percentage (e.g. 20%). For example, the third allowable period T3 of the third path P3 is set to be 10 seconds when the test flight is performed. When the unmanned vehicle 200 performs the task for the first time and the task for the second time, the communication failure processing mechanism is not enabled. However, when the unmanned vehicle 200 performs the task for the third time, the task for the fourth time and the task for the fifth time, the communication failure processing mechanism is enabled. The third allowable period T3 of the third path P3 is set to be 10 seconds*120%=12 seconds. In one embodiment, examining whether the unmanned vehicle 200 can perform the task using the increased corresponding allowable period before performing the task using the increased corresponding allowable period. For example, perform the test flight again.

In one embodiment, the unmanned vehicle 200 performs the task in the route. When the unmanned vehicle 200 continuously performs the task for a plurality of times (e.g. the task is performed continuously for three times). If the period of communication disconnection in another specific one of the paths for each of the plurality of times is less than a corresponding percentage (e.g. 50%) of the corresponding allowable period, the corresponding allowable period of the path is decreased. For example, the corresponding allowable period of the another specific path is decreased by a fixed amount or decreased by a preset percentage (e.g. 20%). For example, when performing a test flight, the fifth allowable period T5 of the fifth path P5 is set to be 6 seconds. When the unmanned vehicle 200 performs the task for the first time, the task for the second time and the task for the third time, the communication failure processing mechanism is not enabled. The periods of communication disconnection are all less than 3 seconds (e.g. 1 second, 2 seconds, and 2.5 seconds respectively), the fifth allowable period T5 of the fifth path P5 is set to be 6 seconds*80%=4.8 seconds. In one embodiment, examining whether the unmanned vehicle 200 can perform the task using the decreased corresponding allowable period before using the decreased corresponding allowable period. For example, perform the test flight again.

In one embodiment, the corresponding allowable period is adjusted according to data of performing the task in each time or in several times recently. For example, the corresponding allowable period can be adjusted based on equation (1).

$$\text{Tp\_new} = \frac{(N-1)^* Tp + Tmeas}{N} \quad \text{(equation 1)}$$

$$T_{P\_new} = \frac{(N-1)^* Tp + Tmeas}{N}$$

In equation (1), N stands for the number for which the task is performed (e.g. the task is performed for N times in total or the task is performed for N times recently). Tp stands for the corresponding allowable period of the path P which is not adjusted yet. Tp_new stands for the path P of the corresponding allowable period which is adjusted. Tmeas stands for the period of communication disconnection measured in the process of performing the task of the $N^{th}$ time. In one embodiment, if a decreased amount of the adjusted corresponding allowable period is not beyond a certain percentage (e.g. 20%), the corresponding allowable period which is not adjusted yet is used. However, if the decreased amount of the adjusted corresponding allowable period is beyond a certain percentage (e.g. 20%), the corresponding allowable period which is adjusted is used. For example, assume that Tp is 10 seconds. In this case, Tp_new is used as the corresponding allowable period of the path P for the task of the $(N+1)^{th}$ time if Tp_new is 5 seconds. However, Tp is used as the corresponding allowable period of the path P for the task of the $(N+1)^{th}$ time if Tp_new is 9 seconds.

According to one embodiment of the present disclosure, the relatively high corresponding allowable periods are set for the paths which have the poor communication quality, so that the unnecessary communication failure mechanism is avoided, and the unmanned vehicle successfully completes the task. However, the relatively low corresponding allowable periods are set for the paths which have the better communication quality, so as to detect the communication failure immediately and raise the safety of the task.

According to one embodiment of the present disclosure, the corresponding allowable periods of the paths are adjusted according to the past records after the unmanned vehicle performs the task or in the process in which the unmanned vehicle performs the task, so that the unmanned vehicle and/or the control station are capable of detecting the communication failure more flexibly and efficiently.

What is claimed is:

1. A method for communication failure detection, comprising:
    obtaining a piece of located path information of an unmanned vehicle, wherein the piece of located path information indicates that the unmanned vehicle is located at a located path of a plurality of paths in a route;
    selecting one of a plurality of allowable periods as a located path allowable period according to the piece of located path information, and setting and starting a timer according to the located path allowable period;
    resetting the timer under a condition that a communication module receives a periodic message before a counting of the timer reaches the located path allowable period; and
    determining that a communication failure occurs under another condition that the communication module does not receive the periodic message when the counting of the timer reaches the located path allowable period.

2. The method for communication failure detection according to claim 1, wherein the located path allowable period is a maximum period of allowable communication disconnection between the unmanned vehicle and a control station in the located path.

3. The method for communication failure detection according to claim 1, wherein selecting one of the plurality of allowable periods as the located path allowable period according to the piece of located path information, and setting and starting the timer according to the located path allowable period comprises:
    determining whether the located path of the unmanned vehicle is identical to a previous located path of the unmanned vehicle; and
    taking a previous located path allowable period as the located path allowable period when the located path of the unmanned vehicle is identical to a previous located path of the unmanned vehicle.

4. The method for communication failure detection according to claim 1, wherein selecting one of the plurality of allowable periods as the located path allowable period according to the piece of located path information, and setting and starting the timer according to the located path allowable period comprises:
    determining whether the located path of the unmanned vehicle has a corresponding allowable period;
    taking the corresponding allowable period as the located path allowable period under a condition that the located path of the unmanned vehicle has the corresponding allowable period; and
    taking a predetermined allowable period as the located path allowable period under another condition that the located path of the unmanned vehicle does not have the corresponding allowable period.

5. The method for communication failure detection according to claim 4, wherein determining whether the located path of the unmanned vehicle has the corresponding allowable period comprising:
    reading a table of path-allowable period stored in a storage device and determining whether the table of path-allowable period comprises the located path and the corresponding allowable period of the unmanned vehicle;
    determining that the located path of the unmanned vehicle has the corresponding allowable period under a condition that the table of path-allowable period comprises the located path and the corresponding allowable period of the unmanned vehicle; and
    determining that the located path of the unmanned vehicle does not have the corresponding allowable period under another condition that the table of path-allowable period does not comprise the located path and the corresponding allowable period of the unmanned vehicle.

6. The method for communication failure detection according to claim 5, wherein the unmanned vehicle performs a test flight to establish the table of path-allowable period, and the table of path-allowable period comprises the plurality of paths and the plurality of allowable periods respectively corresponding to the plurality of paths.

7. The method for communication failure detection according to claim 6, wherein performing the test flight to establish the table of path-allowable period by the unmanned vehicle comprises taking a maximum time interval or a sum of the maximum time interval and a tolerance as the allowable periods, wherein the maximum time interval is one of a plurality of time intervals, each of the plurality of time intervals is defined by two adjacent time points, the unmanned vehicle receives the periodic message from a control station at each time point in each of the plurality of paths.

8. The method for communication failure detection according to claim 6, wherein performing the test flight to establish the table of path-allowable period by the unmanned vehicle comprises taking a maximum time interval or a sum of the maximum time interval and a tolerance as the allowable periods, wherein the maximum time interval is one of a plurality of time intervals, each of the plurality of time intervals is defined by two adjacent time points, a control station receives the periodic message from the unmanned vehicle at each time point in each of the plurality of paths.

9. The method for communication failure detection according to claim 1, wherein resetting the timer under the condition that the communication module receives the periodic message before the counting of the timer reaches the located path allowable period and determining that the communication failure occurs under the another condition that the communication module does not receive the periodic message when the counting of the timer reaches the located path allowable period comprises:
    determining whether the communication module receives the periodic message;
    resetting the timer under a condition that it is determined that the communication module receives the periodic message;
    determining whether the counting of the timer reaches the located path allowable period under another condition that it is determined that the communication module does not receive the periodic message;
    determining that the communication failure occurs and enabling a communication failure processing mechanism under a condition that the counting of the timer reaches the located path allowable period; and
    re-determining whether the communication module receives the periodic message under another condition that the counting of the timer does not reach the located path allowable period.

10. The method for communication failure detection according to claim 9, wherein the unmanned vehicle performs a task in the route continuously for a plurality of times, the located path allowable period is increased under a condition that, for each of the plurality of times, the communication failure processing mechanism is enabled when the unmanned vehicle is in the located path.

11. The method for communication failure detection according to claim 9, wherein the unmanned vehicle performs a task in the route continuously for a plurality of times, the located path allowable period is decreased under a condition that, for each of the plurality of times, a period of communication disconnection between the unmanned vehicle and a control station is less than a corresponding percentage of the located path allowable period in the located path.

12. The method for communication failure detection according to claim 9, wherein the communication failure processing mechanism comprises triggering a safety mechanism, triggering a fail-safe mechanism, notifying an automatic pilot module to return, return to a previous path or a previous waypoint in which a communication not failed, to stay at a present location or to land.

13. The method for communication failure detection according to claim 9, wherein the communication failure processing mechanism comprises notifying a communication failure processing module of a communication failure, displaying a message in a display, releasing a light signal or releasing a voice signal to remind a user of the communication failure.

14. The method for communication failure detection according to claim 1, wherein obtaining the piece of located path information of the unmanned vehicle comprises:
    determining the piece of located path information of the unmanned vehicle by obtaining a position of the unmanned vehicle or using a waypoint at which the unmanned vehicle previously arrived.

15. The method for communication failure detection according to claim 1, wherein obtaining the piece of located path information of the unmanned vehicle comprises:
    receiving a message of a position or a waypoint reported by the unmanned vehicle; and
    determining the piece of located path information of the unmanned vehicle according to the message of the position or the waypoint.

16. A device for communication failure detection, comprising:
    a communication module configured to receive a periodic message;
    a storage device configured to store a plurality of allowable periods;
    a timer configured to count according to a located path allowable period; and
    a processing unit configured to obtain a piece of located path information of an unmanned vehicle, wherein the piece of located path information indicates that the unmanned vehicle is located at a located path of a plurality of paths in a route; the processing unit is configured to select one of the plurality of allowable periods as the located path allowable period according to the piece of located path information of the unmanned vehicle, and set and start a timer according to the located path allowable period; the processing unit is configured to reset the timer under a condition that periodic message is received before a counting of the timer reaches the located path allowable period; and the processing unit is configured to determine that a communication failure occurs under another condition that the periodic message is not received when the counting of the timer reaches the located path allowable period.

17. The device for communication failure detection according to claim 16, wherein the located path allowable period is a maximum period of allowable communication disconnection between the unmanned vehicle and a control station in the located path.

18. The device for communication failure detection according to claim 16, wherein the processing unit is further configured to:
    determining whether the located path of the unmanned vehicle is identical to a previous located path of the unmanned vehicle; and
    taking a previous located path allowable period as the located path allowable period when the located path of the unmanned vehicle is identical to a previous located path of the unmanned vehicle.

19. The device for communication failure detection according to claim 16, wherein the processing unit is further configured to:
    determining whether the located path of the unmanned vehicle has a corresponding allowable period;

taking the corresponding allowable period as the located path allowable period under a condition that the located path of the unmanned vehicle has the corresponding allowable period; and taking a predetermined allowable period as the located path allowable period under a condition that the located path of the unmanned vehicle does not have the corresponding allowable period.

20. The device for communication failure detection according to claim 19, wherein the storage device is further configured to store a table of path-allowable period, and the processing unit is further configured to:

reading the table of path-allowable period stored in the storage device and determining whether the table of path-allowable period stored comprises the located path and the corresponding allowable period of the unmanned vehicle;

determining that the located path of the unmanned vehicle has the corresponding allowable period under a condition that the table of path-allowable period stored comprises the located path and the corresponding allowable period of the unmanned vehicle; and determining that the located path of the unmanned vehicle does not have the corresponding allowable period under another condition that the table of path-allowable period stored does not comprise the located path and the corresponding allowable period of the unmanned vehicle.

21. The device for communication failure detection according to claim 20, wherein the unmanned vehicle performs a test flight to establish the table of path-allowable period, and the table of path-allowable period comprises the plurality of paths and the plurality of allowable periods of the plurality of paths.

22. The device for communication failure detection according to claim 21, wherein when the unmanned vehicle performs the test flight to establish the table of path-allowable period, take a maximum time interval or a sum of the maximum time interval and a tolerance as the allowable periods, wherein the maximum time interval is one of a plurality of time intervals, each of the plurality of time intervals is defined by two adjacent time points, the unmanned vehicle receives the periodic message from a control station at each time point in each of the plurality of paths.

23. The device for communication failure detection according to claim 21, wherein when the unmanned vehicle performs the test flight to establish the table of path-allowable period, take a maximum time interval or a sum of the maximum time interval and a tolerance as the allowable periods, wherein the maximum time interval is one of a plurality of time intervals, each of the plurality of time intervals is defined by two adjacent time points, a control station receives the periodic message from the unmanned vehicle at each time point in each of the plurality of paths.

24. The device for communication failure detection according to claim 16, wherein the processing unit is further configured to:

determining whether the communication module receives the periodic message;

resetting the timer under a condition that it is determined that the communication module receives the periodic message;

determining whether the counting of the timer reaches the located path allowable period under a condition that it is determined that the communication module does not receive the periodic message;

determining that the communication failure occurs and enabling a communication failure processing mechanism under a condition that the counting of the timer reaches the located path allowable period; and re-determining whether the communication module receives the periodic message under a condition that the counting of the timer does not reach the located path allowable period.

25. The device for communication failure detection according to claim 24, wherein the unmanned vehicle performs a task in the route continuously for a plurality of times, the located path allowable period is increased under a condition that, for each of the plurality of times, the communication failure processing mechanism is enabled when the unmanned vehicle is in the located path.

26. The device for communication failure detection according to claim 24, wherein the unmanned vehicle performs a task in the route continuously for a plurality of times, the located path allowable period is decreased under a condition that, for each of the plurality of times, a period of communication disconnection between the unmanned vehicle and a control station is less than a corresponding percentage of the located path allowable period in the located path.

27. The device for communication failure detection according to claim 24, further comprises an automatic pilot module, wherein the communication failure processing mechanism comprises triggering a safety mechanism, triggering a fail-safe mechanism, notifying an automatic pilot module to return, to return to a previous path or a previous waypoint in which a communication not failed, to stay at a present location or to land by the processing unit.

28. The device for communication failure detection according to claim 24, further comprising a communication failure processing module, wherein the communication failure processing mechanism comprises notifying the communication failure processing module of a communication failure, displaying a message in a display, releasing a light signal or releasing a voice signal to remind a user of the communication failure by the processing unit.

29. The device for communication failure detection according to claim 16, wherein the processing unit is further configured to determine the piece of located path information of the unmanned vehicle by obtaining a position of the unmanned vehicle or using a waypoint at which the unmanned vehicle previously arrived.

30. The device for communication failure detection according to claim 16, wherein the communication module is further configured to receive a message of a position or a waypoint reported by the unmanned vehicle; and determine the piece of located path information of the unmanned vehicle according to the message of the position or the waypoint.

* * * * *